(No Model.)
E. G. BOYNTON & A. G. BROWN.
DRAFT EQUALIZER.
No. 418,269. Patented Dec. 31, 1889.
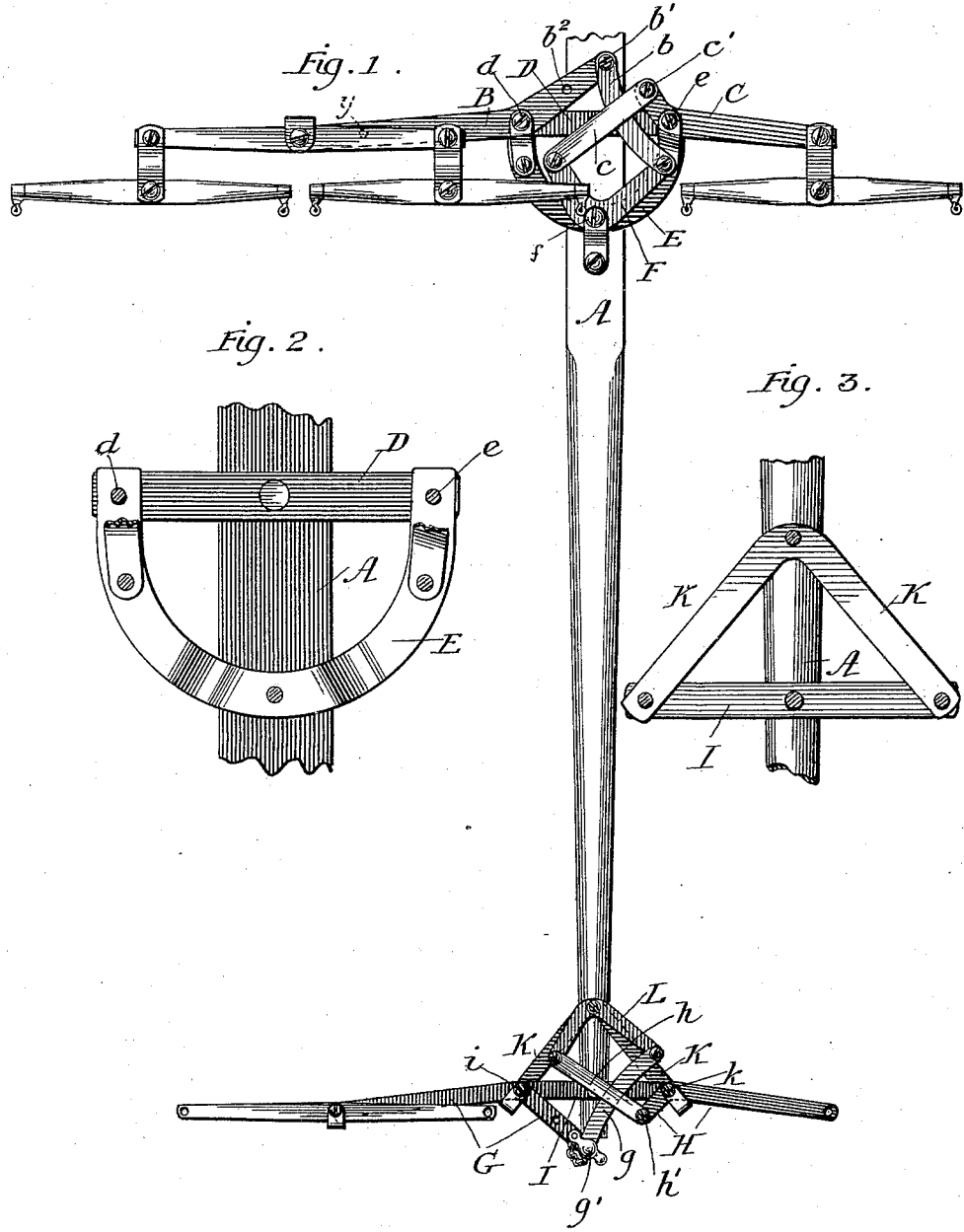

UNITED STATES PATENT OFFICE.

ERVIN G. BOYNTON AND ALFRED G. BROWN, OF LA CROSSE, WISCONSIN.

DRAFT-EQUALIZER.

SPECIFICATION forming part of Letters Patent No. 418,269, dated December 31, 1889.

Application filed September 27, 1889. Serial No. 325,234. (No model.)

*To all whom it may concern:*

Be it known that we, ERVIN G. BOYNTON and ALFRED G. BROWN, citizens of the United States, residing at La Crosse, in the county of La Crosse and State of Wisconsin, have invented certain new and useful Improvements in Draft-Equalizers; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to that class of devices which are intended to equalize the draft when it is desired to use more than two horses abreast and place a larger number upon one side of the center of draft than upon the other.

It has for its object the combined purpose of equalizing the forward draft and the hold-back and lateral draft at the neck-yoke.

Heretofore draft-equalizers have been advantageously applied only to vehicles and implements in use upon level ground and where the work involved straight pulling, the turns being comparatively few and made while no work is being done. They have not been satisfactory when applied to road-vehicles, for the reason that no provision is made for an equal distribution of the burden when descending a hill or turning a corner.

One of the difficulties encountered in moving heavy vehicles by horses is the lateral pounding of the tongue caused by the roughness of the road. This is usually obviated in using two horses by so adjusting the harness as to permit the animals to travel wide apart. In the use of three horses this is obviously impracticable, and the result is, that all of the force of the blows falls upon two of the horses, and in most instances upon a single horse. As a consequence of this it is a common thing in fire-departments for one of the horses of the team to be disabled for several days after a hard run to a fire. Our device obviates all of these difficulties by providing a neck-yoke, to which each horse may be attached by a short strap or chain, and which distributes equally among all of the horses all lateral as well as all backward draft. The forward draft being also equally distributed, our invention may be properly termed a "universal draft-equalizer."

Another valuable feature of our device is found in the fact that it may be instantly adapted to the use of but two horses.

In the accompanying drawings, Figure 1 represents a plan view of our entire device. Figs. 2 and 3 show the bed-plate of the draft-equalizer and neck-yoke, respectively.

The purpose of an equalizer is to transfer from the side of the pole upon which the excess of power is applied to the opposite side thereof so much of that excess as may be necessary to produce an equilibrium, and also to locate the draft-points equidistant from the center of the pole, so as to obviate all tendency to side or diagonal draft. Any draft-equalizer which effectually accomplishes these objects, and which is capable of being applied in a reverse position to the outer end of the vehicle-pole, is capable of being adapted for use as a universal draft-equalizer, such as we have invented, though our invention relates more particularly to the adaptation to such use of the equalizer invented by Alfred G. Brown, one of the parties to this application, and made the subject of an application for Letters Patent filed August 1, 1889, and being numbered 319,427.

In the accompanying drawings, A represents an ordinary vehicle pole or tongue. The long or two-horse draft-lever is represented by B, and the short or one-horse draft-lever by C. These levers are pivoted, respectively, at $d$ and $e$ to a fixed cross-arm D, the pivotal points being equidistant from the center of the pole. A suitable brace, as the half-circle E, is used to strengthen the fixed cross-arm. The inner or short ends of the draft-levers B C are united through the medium of the angle-bar F, which is pivotally attached to the vehicle-pole at $f$, and the rods or straps $b$ $c$ pivoted, respectively, to the short ends of the levers B and C at $b'$ and $c'$ and to opposite ends of the angle-bar F.

Availing ourselves of the principle that the pressure at the fulcrum is equal to the sum of the power applied and the resistance offered, the same pressure is secured at the fulcrum-points $d$ and $e$ by properly proportioning the levers B C, account being taken of the fact that the power applied to the lever B is double the power applied to the lever C. This form of construction secures excess of back-pressure at $c'$ over that at $b'$. This excess is overcome by so pivoting the angle-bar F that the lever B is connected to its longer end. By pivoting the strap $b$ at $b^2$ and attaching a single whiffletree at $y$ the device is adapted to the use of two horses only. The neck-yoke is exactly like the forward draft device above described, having the levers G and H, corresponding, respectively, to the levers B C, the fixed cross-arm I and brace K, corresponding to D and E, the connecting-straps $g$ and $h$, corresponding to the straps $b$ and $c$, and the pivoted angle-bar L being the equivalent of the angle-bar F.

To secure economy of space it is advisable to construct the forward draft device so that the angle-bar F is in advance of the cross-arm D and the neck-yoke, so that the angle-bar L is to the rearward of the cross-arm I, though the reverse of this form of construction is equally operative. For the same reason it is advisable to curve various of the moving parts, as shown.

We claim—

1. The combination of a forward draft-equalizer with an equalizing neck-yoke having independent holdback-levers and an intermediate compensating lever, substantially as described, and for the purpose set forth.

2. In a universal draft-equalizer, the combination of a forward draft-equalizer having independent draft-levers pivoted at equal distances from the center line of the vehicle-pole, and having their inner ends connected by suitable straps with opposite ends of an angle-bar pivoted to said pole, with a neck-yoke having independent holdback-levers pivoted at equal distances from the center line of the vehicle-pole, and having their inner ends connected by suitable straps with opposite ends of an angle-bar pivoted to said pole, substantially as shown and described.

3. In a universal draft-equalizer, the combination of an equalizing neck-yoke having independent holdback-levers pivoted at equal distances from the center line of the vehicle-pole, and having their inner ends connected by suitable straps with opposite ends of an angle-bar pivoted to said pole, with a forward draft-equalizer, substantially as described, and for the purposes set forth.

4. In a draft-equalizer adapted to equalize the forward and the holdback draft of a vehicle, the combination of independent draft-levers pivoted upon opposite sides of the vehicle-pole and equidistant from the center line thereof with an angle-bar pivoted to said pole and connecting straps or links uniting the inner ends of the draft-levers to opposite ends of said angle-bar, said draft-levers being so proportioned relatively that the pressure at their respective pivotal points is equal, and the two ends of the angle-bar being of such relative proportions as to equalize the unequal pressure at the inner ends of the draft-levers, substantially as described, and for the purposes set forth.

In testimony whereof we affix our signatures in presence of two witnesses.

ERVIN G. BOYNTON.
ALFRED G. BROWN.

Witnesses:
R. L. SPENCE,
H. J. PECK.